(12) United States Patent
Coxwell

(10) Patent No.: US 10,157,537 B1
(45) Date of Patent: Dec. 18, 2018

(54) REMOTELY CONTROLLED ACCESS SECURITY SYSTEM

(71) Applicant: COASTAL STEEL MANUFACTURING, LLC, Cocoa, FL (US)

(72) Inventor: Dale Coxwell, Melbourne, FL (US)

(73) Assignee: COASTAL STEEL MANUFACTURING, LLC, Cocoa, FL (US)

( * ) Notice: Subject to any disclaimer, the term of this patent is extended or adjusted under 35 U.S.C. 154(b) by 0 days.

(21) Appl. No.: 15/949,451

(22) Filed: Apr. 10, 2018

Related U.S. Application Data

(60) Provisional application No. 62/546,049, filed on Aug. 16, 2017.

(51) Int. Cl.
| | |
|---|---|
| *G08C 17/02* | (2006.01) |
| *H04N 5/232* | (2006.01) |
| *G07C 9/00* | (2006.01) |
| *B64C 39/02* | (2006.01) |

(52) U.S. Cl.
CPC ............ *G08C 17/02* (2013.01); *B64C 39/024* (2013.01); *G07C 9/00309* (2013.01); *H04N 5/23206* (2013.01); *B64C 2201/127* (2013.01); *B64C 2201/146* (2013.01); *B64C 2201/20* (2013.01); *G07C 2009/00769* (2013.01)

(58) Field of Classification Search
CPC ................ G98C 17/02; H04N 5/23206; G07C 9/00309; G07C 2009/00769; B64C 2201/146; B64C 2201/127; B64C 2201/20; B64C 39/024; E05G 5/02; G06K 9/00228

USPC ......................................................... 340/5.2
See application file for complete search history.

(56) References Cited

U.S. PATENT DOCUMENTS

| | | |
|---|---|---|
| 5,992,094 A | 11/1999 | Diaz |
| 7,631,806 B2 | 12/2009 | Wallerstorfer et al. |
| 8,819,855 B2 | 8/2014 | Prasad et al. |
| 9,057,210 B2 | 6/2015 | Dumas et al. |
| 9,557,719 B2 | 1/2017 | Liu et al. |
| 9,875,592 B1 | 1/2018 | Erickson et al. |
| 2013/0043974 A1* | 2/2013 | Hyde .................. A61B 5/4833 340/5.61 |
| 2018/0025242 A1 | 1/2018 | Chandraker et al. |

* cited by examiner

*Primary Examiner* — Ali Neyzari
(74) *Attorney, Agent, or Firm* — Allen, Dyer, Doppelt + Gilchrist, P.A.

(57) ABSTRACT

An access security system includes at least one access control vestibule, a metal detector, a lock system, a camera, and a controller. A wireless router is connected to the controller and provides a secure, wireless local access network (WLAN) in the vicinity of the access control vestibule. A wireless controller pad includes a display and graphical user interface. A wireless transceiver communicates wirelessly over the WLAN with the controller. A processor at the wireless controller pad permits user interaction via the display and user interface and generates and transmits control signals to the controller to allow the user to control and configure locally the operation of the metal detector, lock system, at least one camera, and WLAN as a secure local access security system having no outside connection beyond the secure premises.

22 Claims, 12 Drawing Sheets

REMOTELY CONTROLLED ACCESS SECURITY SYSTEM

PRIORITY APPLICATION(S)

This application is based upon provisional application Ser. No. 62/546,049 filed Aug. 16, 2017, the disclosure which is hereby incorporated by reference in its entirety.

FIELD OF THE INVENTION

This invention relates to access security systems, and more particularly, this invention relates to controlling remotely security system components associated with at least one access control vestibule or other secure entry and exit system.

BACKGROUND OF THE INVENTION

Physical access security systems for banks, schools and similar locations that require high security may include a metal detector located within an access control vestibule, which includes at least one entrance door and an exit door, a camera, and typically a communications system, such as an intercom, that allows a security officer to communicate with an individual within the vestibule. Some access control vestibules may be controlled remotely via the internet or other communications system from a central security headquarters or police headquarters where a central administrator makes decisions over the operation of many individual access control systems. This central authority also makes these multiple access control systems vulnerable to cyber intruders or internet hacker attacks, thus, giving unauthorized users access to the different components, including locking systems on the door.

Another drawback of such access control systems is the central administrator could be located dozens, hundreds, or thousands of miles away and the central administrator may control hundreds or even thousands of such systems, requiring centralized programming and remote access to the access control vestibule, thus reducing the overall security. These access control systems can be readily compromised in their security.

Another drawback is the access control vestibules could have doors that automatically lock and trap a user when the metal detector detects metal or another sensor detects a harmful substance such as drugs, explosives, or narcotics. Other access control vestibules are designed to always have the entrance door unlocked so that the person trying to enter may leave without further trouble, making it impossible to prevent an individual considered dangerous to the public from freely leaving the vestibule into the public. In yet other systems that automatically lock, if the person entering tries to forcibly enter, then the doors are automatically locked as a "man trap" and there is no supervisory action in real-time to override the locked door situation or make a decision to keep the door locked for only a limited time. Also, there is usually no access control system that ensures that the person trying to enter, but has been forced to leave, can be tracked or located until further decisions are made regarding that person and/or the police arrive.

It would be advantageous to provide a more secure access security system that uses an access control vestibule with greater control at the local level to prevent cyber intrusions and provide a secure local access control system, and alternatively, at an administrator or network level and provide yet further benefits.

SUMMARY OF THE INVENTION

An access security system includes at least one access control vestibule to facilitate entrance and exit of individuals into and from a secure premises. The access control vestibule comprises a frame, and bullet resistant glass and at least one entrance door and exit door. A metal detector is positioned within the access control vestibule through which an individual desiring to enter the secure premises must pass through. A lock system is connected to the entrance and exit doors. At least one camera is configured to image the interior of the access control vestibule and an individual within the access control vestibule.

A controller is connected to the metal detector, lock system, and at least one camera and configured to control operation of the metal detector, lock system and at least one camera. The controller includes a transceiver. A wireless router is connected to the controller and provides a secure, wireless local access network (WLAN) in the vicinity of the access control vestibule. A wireless controller pad comprises a processor, memory and a display on which a user interface is displayed and a wireless transceiver operative with the processor, memory and display and configured to communicate wirelessly over the WLAN with the controller. The processor is operative to permit user interaction via the display and user interface and generate and transmit control signals to the controller to allow the user to control and configure locally the operation of the metal detector, lock system, at least one camera, and WLAN as a secure local access security system having no outside connection beyond the secure premises.

In an example, a drone has a drone processor and a drone transceiver and a camera is connected thereto and operative to hover over the secure premises and image the area of the secure premises having the at least one access control vestibule and transmit the images to said wireless communications module of said wireless controller pad. A drone docking station may be at the premises and includes a communications module configured to communicate with drones and to one or more of the controller and the wireless controller pad. A plurality of drones are docked at the drone docking station for selective airborne operation of a drone and permit constant hovering by at least one drone over the secure premises.

The processor at the wireless controller pad is configured to generate and transmit drone control signals to an airborne drone or the drone docking station and control operation of an airborne drone. In another example, the wireless router provides a secure, wireless local access network of about 50 to about 250 foot range. The access control vestibule may include an entrance compartment and an exit compartment, and each compartment has two intercommunicating doors and at least one camera in each of the entrance compartment and exit compartment and configured to image the interior of the compartments and an individual passing therethrough. The access control vestibule may include a magnetic lock on each door and an access control identifier system and each connected to the controller. The magnetic locks and access control identifier system are operative to be controlled via the wireless controller pad and from the control signals generated therefrom. The access control identifier system may comprise one or more of a card reader, signature pad, PIN input, fingerprint sensor, facial recognition, and retinal scanner. The access control vestibule may further comprise one or more of an intercom, infrared sensors, a call button, control lights, an audible alarm, an emergency override system, and one or more of seismic, explosive and radiation sensors, and each connected to said controller and operative to be controlled by the wireless controller pad. A plurality of access control vestibules may be included at the premises, and each access control vestibule may have a metal detector, a lock system, at least one camera, and a controller connected therewith. The wireless controller pad is connected via the wireless router to each of the controllers to allow user selection, interaction and control of a selected access control vestibule via the wireless controller pad.

In yet another example, an access security network system includes a first access control system at a first secure premises at a first geographic location and a second access control system at a second secure premises at a second geographic location remote from the first geographic location, each of the first and second access control systems comprising at least one access control vestibule to facilitate entrance and exit of individuals into and from the respective secure premises. Each of the access control vestibules comprises a frame, and bullet resistant glass and at least one entrance door and exit door. A metal detector is positioned within the access control vestibule through which an individual desiring to enter the secure premises must pass through and a lock system is connected to the entrance and exit doors.

At least one camera is configured to image the interior of the access control vestibule and an individual within the access control vestibule. A controller is connected to the metal detector, lock system, and at least one camera. A wireless router is connected to the controller and provides a secure, wireless local access network (WLAN) in the vicinity of the access control vestibule. A wireless controller pad may comprise a processor, memory and a display on which a graphical user interface is displayed and a wireless transceiver is operative with the processor, memory and display and configured to communicate wirelessly over the WLAN with the controller. The processor is operative to permit user interaction via the display and graphical user interface and generate and transmit control signals to the controller to allow the user to control and configure locally the operation of the metal detector, lock system, at least one camera, and WLAN.

A premises control center is at the secure premises and may comprise a processor, memory and premises communications module and connected to the controller and operative to communicate with the controller and generate control signals to the controller and override commands from the wireless controller pad and allow a user at the premises control center to control and configure operation of the metal detection system, lock system, at least one camera, and WLAN. A network control center is located at a third geographic location remote from first and second geographic locations and comprising a processor, memory and network communications module and connected to each premises control center of the first and second access control systems via a communications network and operative to generate control signals and communicate with a controller at respective first and second access control systems and override commands from the wireless controller pad and premises control center and allow a user at the network control center to control and configure operation of the metal detection system, lock system, at least one camera, and WLAN.

The access security network system may further comprise a plurality of access control systems at respective other secure premises each located at separate geographic locations remote from each other and remote from the first and second geographic locations. Each of the plurality of access control systems may include at least one access control vestibule and a premises control center, wherein said network control center is connected to each premises control center at respective access control systems via the communications network. The communications network may comprise one or more of an internet and public switched telephone network. The network control center may comprise a police station.

DESCRIPTION OF THE DRAWINGS

Other objects, features and advantages of the present invention will become apparent from the detailed description of the invention, which follows when considered in light of the accompanying drawings in which.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
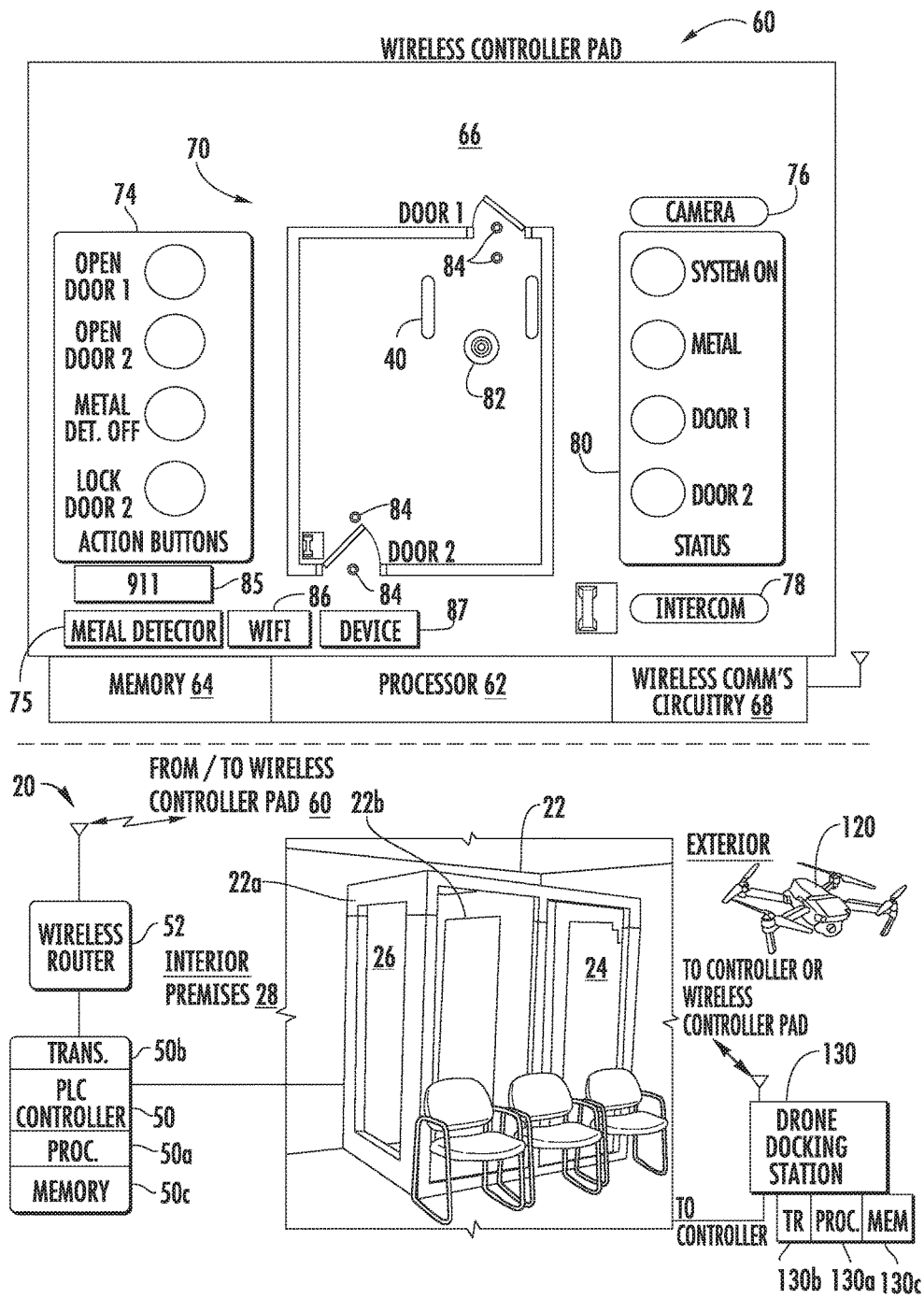
FIG. 1 is a partial block diagram and environmental view of the access control system showing a screen shot of the user interface on the display of the wireless controller pad and a physical representation of an access control vestibule that the wireless controller pad controls in accordance with a non-limiting example.
Figure 2:
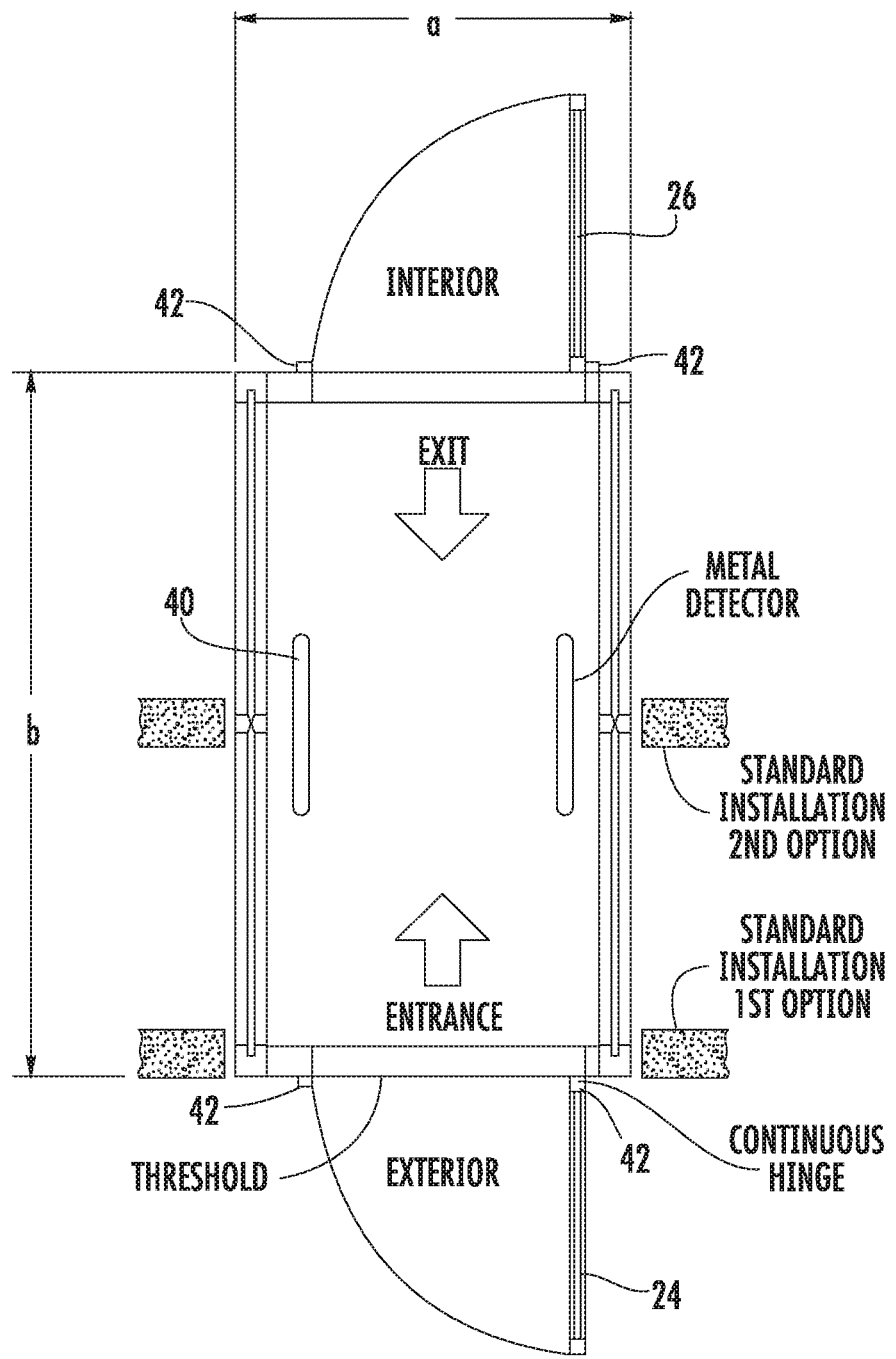
FIG. 2 is a schematic plan view of a two-door, one-channel access control vestibule such as shown in FIG. 1.
Figure 3:
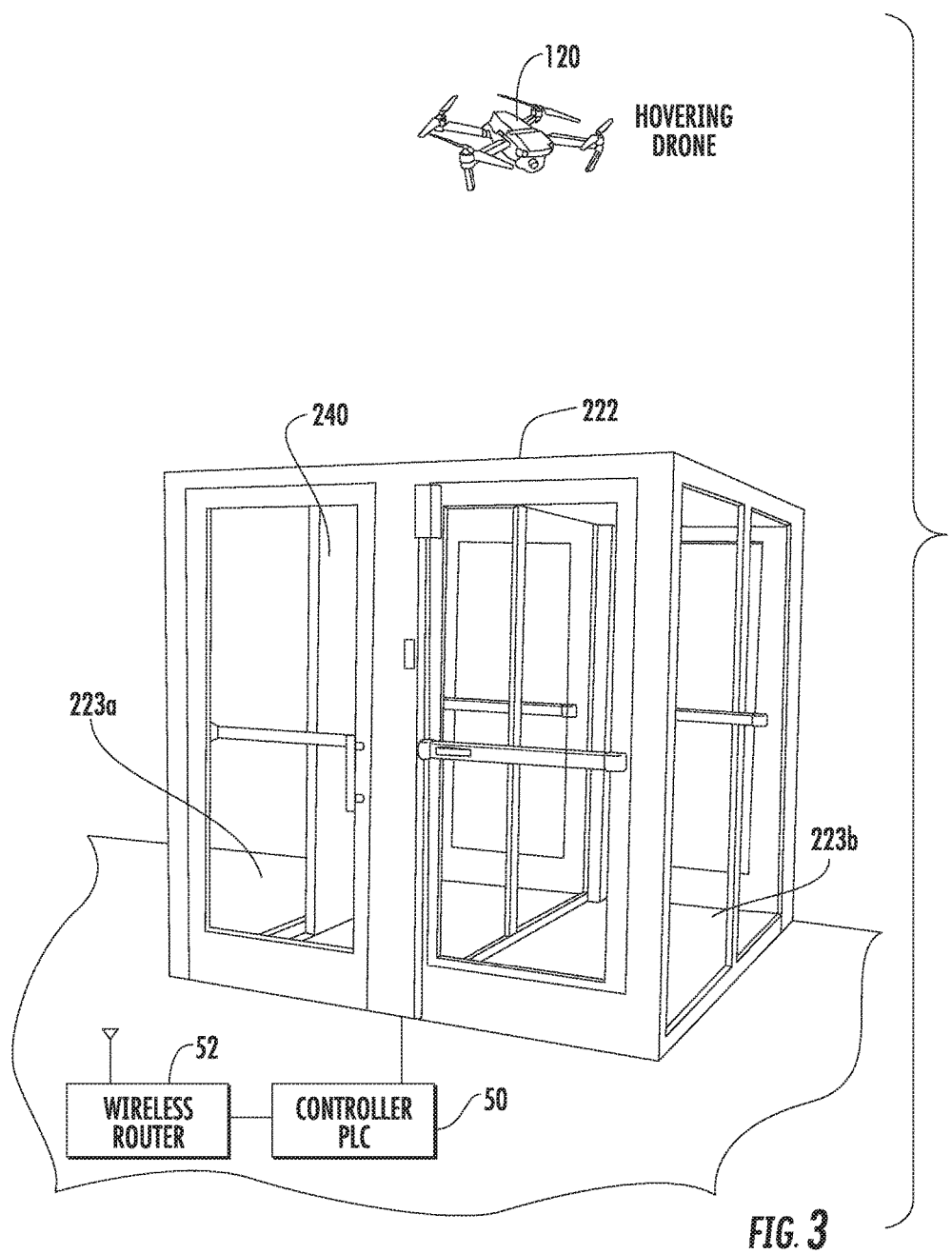
FIG. 3 is an environmental view of a four-door, two-channel access control vestibule in accordance with a non-limiting example.
Figure 4:
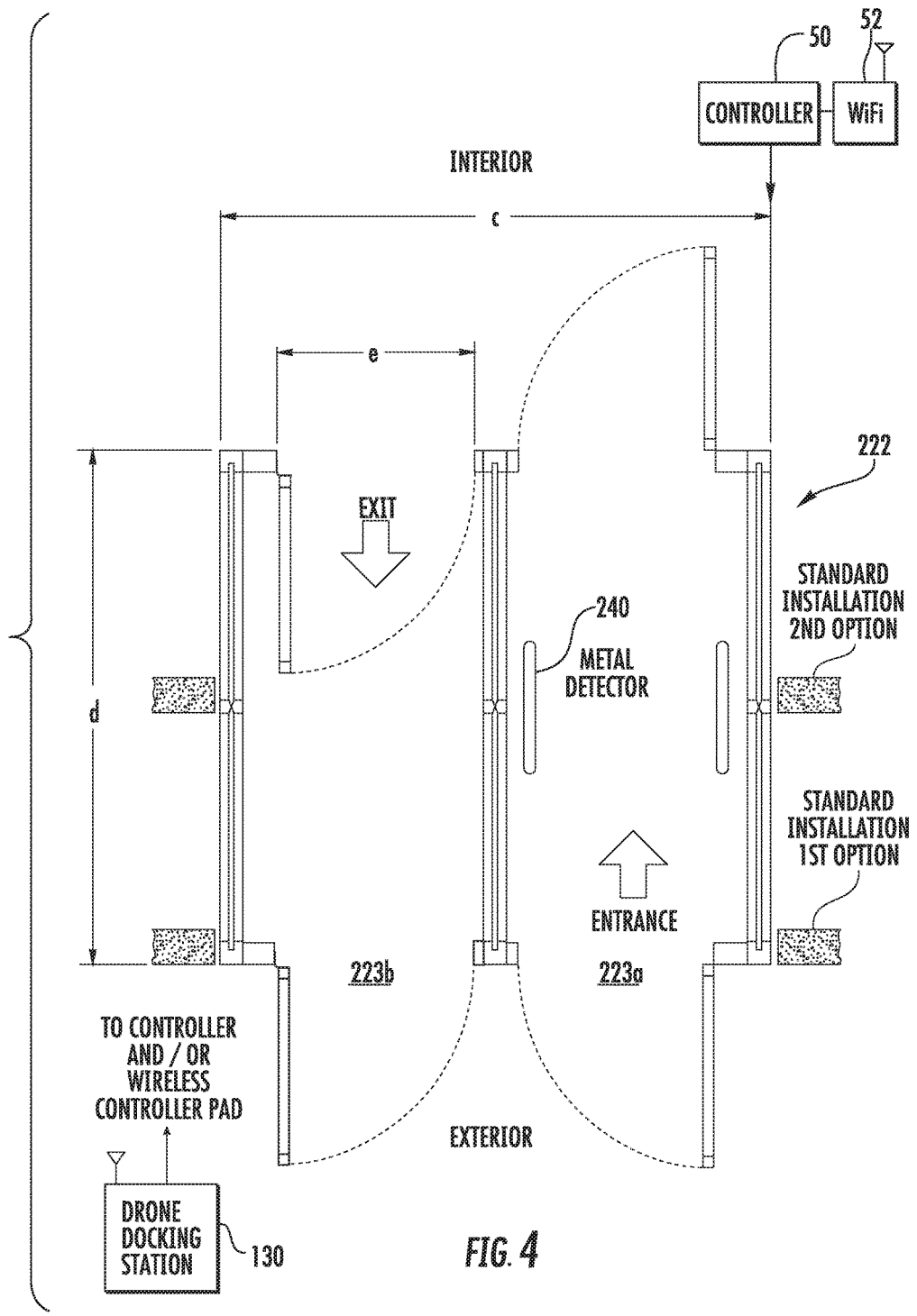
FIG. 4 is a schematic plan view of a four-door, two-channel access control vestibule such as shown in FIG. 3.

The access security system is effective as a physical security system against armed robbers, intruders, and trespassers at banks, schools, and other secure premises and facilities. The access control system may include as non-limiting examples a two-door access control vestibule located at a secure premises, as shown in FIGS. 1 and 2, or a four-door access control vestibule as shown in FIGS. 3 and 4. Other systems can be used depending on design requirements. The access security system provides effective security for financial institutions, global corporations, educational facilities, and other companies that require high security and may have discerning customers that request high security or require an establishment that meets homeland security standards. The access control system includes an access control vestibule such as shown in FIGS. 1 and 3 operating as an entryway security screening system for the detection of individuals carrying weapons, chemicals, drugs, or narcotics into a facility without authorization, therefore minimizing the possibility of an armed take-over or bringing dangerous explosives, chemicals, drugs, or narcotics into secure premises.

Other facilities that may require the access security system may include financial institutions, casinos, including the back/front entrance and money counting rooms, jewelry and other high-end retail or wholesale stores. The system may be particularly effective with money change or cash loan offices, post offices, state and federal prisons, and vulnerable professional medical offices, such as psychiatrist or similar doctors' offices that may require an extra level of security. The access security system deters and prevents armed robbery and heightens employee and customer safety. It includes customizable configurations and meets all ADA guidelines and U.S. fire codes.

The access security system may be networked and used with a plurality of secure premises, such as schools, each secure premise having a plurality of access control vestibules and a controller. A security specialist, such as the school principal or security officer, could have possession of a wireless controller pad that controls each of the access control vestibules at that respective school. Use of a limited range but secure WiFi connection would allow complete local control so that the entire access security system could be secure locally and separate from any other higher level control if desired.

Alternatively, a general administrator located on the premises at a premises control center, for example, a school principal or other official with supervisory capability can override actions taken by the operator of the wireless controller pad and lock the vestibule doors and lock someone in the access control vestibule who is considered dangerous and may have a gun and pose a threat to the public and especially school children. An administrator or supervisor at a network control center could override local operation at the premises from either the wireless controller pad or premises control center and could be a school superintendent office or an officer at a police station.

Another positive benefit of this access control system is the use of unmanned aerial vehicles, i.e., drones, to provide constant overhead camera coverage and could dock at a drone docking station. When one drone battery is failing in an airborne drone, it can land and a second drone lift and hover over the secure premises over a respective access control vestibule such as at a school and automatically hover near or over an access control vestibule. A drone camera could video or take multiple still images and transmit the images or video to the wireless controller pad and/or premises control center. The system could also work in conjunction with a camera within the access control vestibule for tracking and following a suspect that could pose a danger to the public and school children. As will be explained in greater detail below, drone operation could be overridden by police or other supervisors operating in real-time.

Referring now to FIG. 1, there is illustrated an overall view of the access security system 20 that shows in the lower part of FIG. 1 an access control vestibule 22 that includes a frame 22a and bullet resistant glass 22b and at least one entrance door 24 and exit door 26 leading into a secure premises 28. The system shown in FIG. 1 is a two-door, one-channel access control vestibule 22 built for secure passage in two different directions, entry and exit, for space constrained environments. An example may be a bank or small office or perhaps even a school. Passage is through the compartment as controlled by a set of the two intercommunicating doors shown also in FIG. 2.

A metal detection system such as a vertical or walk-through metal detector 40 (FIGS. 2, 5B and 5C) is positioned within the access control vestibule 22 so that an individual desiring to enter the secure premises 28 and pass through the access control vestibule must pass through the metal detector 40. A lock system 42 such as a magnetic lock is connected to each of the entrance and exit doors (FIGS. 2, 5C and 5D). At least one camera 44 preferably images the interior of the access control vestibule 22, and in an example, is located on the metal detector 40, but could be located at other locations (FIG. 5B).

As noted before, the access control vestibule 22 may be formed from aluminum such as heavy duty ¼ inch aluminum wall construction and use a modular hardware with ballistic glass that may provide UL level 1-3 ballistic protection such as from 9 mm to 0.44 magnum and equivalent handguns or even much stronger UL level 4-8 ballistic protection. It may include a sensor such as an infrared sensor to allow only a single occupancy within the vestibule and single individual passage for those high security premises and prevent "tailgating." The ¼ inch wall extruded high tensile strength aluminum tubing provides a strong platform and may have in one example heavy duty doors. The door lock 42 could be a magnetic lock such as anywhere from a 600 to 1,500 pound magnetic lock and according to some requirements, a 1,200 pound magnetic lock. It may have a deadbolt lock that securely deadbolts in case of power or lock failure or failure from the controller.

An infrared or other sensor could be located in the ceiling of the vestibule or other location and indicate when a user has entered the system, which would not be affected by any light changes. The metal detector 40 is preferably a DHS certified metal detector. The entrance and exit doors 24,26 may be interlocking door systems. Access to the access control vestibule 22 could be controlled via an access control identifier system 46 (FIG. 5D), which includes different access components, such as a card reader 46a, a biometric scan system 46b, pin code input 46c onto a touch screen or input pad, retinal scan 46d, fingerprint sensor 46e, facial recognition system 46f, signature pad 46g, or other identifier system.

As noted before, the system includes at least one camera 44 and preferably a number of cameras at different locations, and may include a drone camera as will be explained below. A camera may be located at the entrance door and another at an exit door when a two-door or four-door, two-channel access control vestibule is used. As explained in greater detail below, a controller 50 may include a switch for controlling any cameras.

As illustrated in the examples of FIGS. 1 and 2, the controller 50, which may be a programmable logic controller (PLC) and include a processor 50a, transceiver 50b, and memory 50c, is connected to the metal detector 40, the entrance and exit doors 24,26, door locks 42, and camera 44. A wireless router 52 is connected to the controller 50 and provides a secure, wireless local access network (WLAN) in the vicinity of the access control vestibule. This wireless router 52 communicates with the wireless controller pad 60 as shown in the top part of FIG. 1 via the secure, wireless local access network 54 for controlling the metal detector 40, lock system 42, at least one camera 44, and other security features and components of the access security vestibule such as intercoms or push-to-talk buttons that form a communications system for communicating with a security officer at a vestibule. The wireless controller pad 60 includes a processor 62, a memory module 64, and a display 66, including a wireless communications module or circuitry as a wireless transceiver 68, and appropriate transceiver circuitry. A user interface 70 is displayed to allow user interaction via the wireless controller pad 60 and control and program the various components of the access control vestibule 22 such as the metal detector 40, for example, by controlling its sensitivity or turning it on and off, the locks 42 for locking and unlocking entrance and exit doors 24,26, any cameras 44, and any components of the access control identifier system 46, and/or communication system such as an intercom.

As illustrated, the wireless controller pad 60 includes a display 66 having a user interface 70 that displays in one example as illustrated, an outline of the access control vestibule 22 and various operating or programming buttons as part of a human machine interface, for example, the action buttons 74 for Open Door 1 or Open Door 2, or turning the Metal Detector Off and Lock Door 2, for example, as the second or exit door from the vestibule leading as an entrance directly into the facility such as a bank or school.

It is also possible to have a lock door 1 button (not shown) corresponding to the entrance to the access control vestibule 22. In certain examples, this entrance door as the first door may be automatically locked so that the access control vestibule 22 in effect becomes a "man trap" and locks the individual positioned within the access control vestibule 22 within the confines of the vestibule. This may be important such as when that individual may be considered dangerous and must be held within the vestibule until authorities arrive. It is also possible that a supervisory authority, such as at a premises control center or a network control center, such as a police station and explained in further detail below, may have the capability to override actions from the wireless controller pad 60 and/or lock or unlock any doors when necessary such as when that person is considered to be restrained or safe to exit.

In some cases depending on the facility, both doors may lock when the metal detector 40 detects a gun or other metal object such as a knife or another sensor detects a dangerous substance such as a chemical, explosive, or narcotic. Typically, the first door as the entrance to the access control vestibule would remain unlocked so that if a metal detector 40 or other sensor sends an audible alarm or generates a signal to the wireless controller pad 60 that indicates the individual trying to enter the secure facility is carrying a gun or knife through the metal detector, the person can leave on their own volition. However, if the access control vestibule 22 is within a school, then the system may be configured so that both doors lock since the person that triggered the metal detector or other sensor may be considered dangerous to the public and should be retained therein. A security officer or other individual having access via the wireless controller pad 60 could make a decision to lock or unlock the door and enter appropriate commands via the interface.

The metal detector 40 may have different levels of sensitivity that could be adjusted via the wireless controller pad 60 such as shown via the block entitled metal detector 75 and a screen could pop up on the display to change metal detector settings. Once that button is pressed, then another screen could be displayed that shows details about the metal detector and its sensitivity. The metal detector also could be turned off or on or made less sensitive when a code is entered onto a pin pad at the vestibule entrance or a card belonging to one having authority to carry a gun entered or slid through a card reader. There could be a retinal scanner or other identification system that could be used and the sensitivity changed or metal detector completely overridden.

The wireless controller pad 60 may include a camera button 76 that could be depressed to bring up live video or still images from a camera 44 and show them on the display. An intercom button 78 on the wireless controller pad 60 may activate different components of any communications system and provide communications via an intercom and speaker with a security officer or even an administrator or supervisor such as a network administrator or police station. Other interfaces could include the status display 80 showing the system is "on" and the metal detector is "active" and the status of Door 1 and Door 2 as "locked" or "unlocked." A person entering the vestibule is shown in the image on the display for the access control vestibule as a dot 82 in this non-limiting example. Other sensors 84 are shown by the red dots and could be sensors for chemicals, narcotics, explosives, or sensors to detect door movement or the presence of an individual to ensure there is only one person entering the vestibule. Other indicia or icons for the status of the security system may be displayed as necessary or desired. It is possible to have a 911 interface button 85 to call 911 in an emergency and a WiFi interface button 86 and a device interface button 87 that could be pressed to bring up an interface showing different vestibule components that could be adjusted.

The controller 50 in one example is preferably formed as a programmable logic controller (PLC) as explained in greater detail below and the wireless router 52 may provide a secure, wireless local access network (WLAN) having a signal strength to provide a signal range of about 50 to about 100 feet in an example, and in other examples, up to 150 to 750 feet or even 300 feet. Encryption is used. One of the advantages of the current system is there in the example such as FIG. 1 no outside connection for the access control system 20 beyond the secure premises and all communication is by WLAN and controller connections to the vestibule. That example ensures hackers or other cyber intruders would not be able to intrude. The WiFi range could be limited in power so that it effectively does not extend beyond the premises 28.

However, it should be understood that the WiFi system may include WiFi extenders and include one or multiple NIC supporting fast Ethernet or gigabit Ethernet integrated into a main SOC. Any wireless routers may operate on 2.4 GHz and 5 GHz bands simultaneously and data transfer rates may exceed 300 Mbit/S for 2.4 GHz band and up to 450 Mbit/S for 5 GHz band. The wireless controller pad 60 may have a button for WiFi access as illustrated.

As noted before, the doors 24,26 may include one or more magnetic locks 42 and other security components as part of the access control vestibule 22. These other components as part of the vestibule 22 are shown in FIG. 5C and could include the intercom 90a, infrared sensors 90b, a call button 90c, control lights 90d, audible alarms 90e, an emergency override 90f, seismic, explosive and/or radiation sensors 90g, and the access control identifier system 46 and its components. All of these components are connected to the controller 50 via an appropriate bus or other control or connection system and operative to be controlled and programmed via the wireless controller pad 60 using a device control button 87 or other interface, which when depressed could bring up a separate menu or interface for controlling and configuring a specific component. As noted before, the access control identifier system 46 may include one or more of a card reader, signature pad, PIN input, fingerprint sensor, facial recognition and retinal scanner as non-limiting examples.

The access control vestibule 22 as noted before typically can be formed of a bullet resistant aluminum frame that is enclosed by bullet resistant glass and a bullet resistant ceiling. Control may be achieved over the use of exit devices, magnetic locks, sensors, and the metal detector. The wireless controller pad 60 provides status information for the system and may allow override of all its functions. IT also may provide two-way communication and video between the operator and the user within the access control vestibule.

Figure 8:
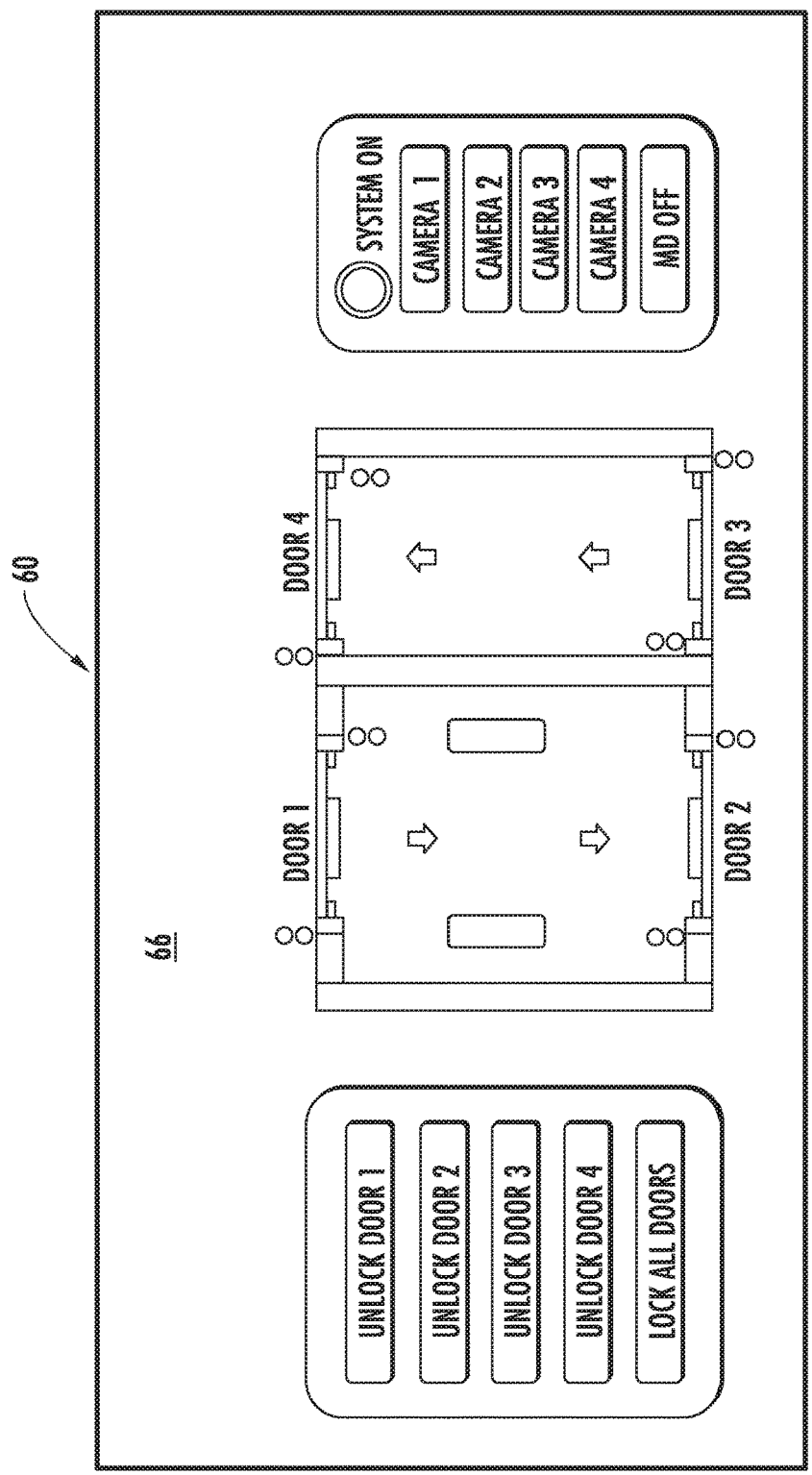
FIG. 8 is a screen shot of the user interface showing a four-door, two-channel access control vestibule similar to that shown in FIGS. 3 and 4.

A four-door, two-channel access control vestibule is shown in FIGS. 3 and 4, and given a description in the 200 series as 222. The frame is divided into two separate compartments with one compartment for entry 223a and one compartment for exit 223b, each having an entrance and exit door. Passage through each compartment may be controlled by the set of two intercommunicating doors. Entry doors and exit doors may be totally separate systems. Multiple cameras can be used and multiple sensors used with the metal detector 240 located in the entrance. Other components as described relative to FIGS. 1 and 2 would be the same and controlled via the controller 50 and wireless controller pad 60. An example display screen with a user interface is shown in FIG. 8 for this four-door, two-channel access control vestibule 22 and shows the different locks that can be applied for each door and the different cameras, such as for cameras for each door for both entering and exiting the access control vestibule. The MD off may correspond to the metal detector off and on switch. It could also bring up a screen for adjusting sensitivity. Other buttons that are not illustrated may be included and may include those similar to that shown in FIG. 1.

It is possible to have multiple wireless controller pads 60 that are similar to i-pads or other wireless touchscreen tablets. Smart phones could possibly be used to connect to the controller 50. The user interface 70 as a human machine interface controls is used to control the access control vestibule 22 as shown in FIG. 1. The controller 50 may be a desk mounted hardwired controller and operate wirelessly with the wireless controller pad 60 and operate as a real-time display the interface for control and even display metrics and statistics. With different screens brought up on the display, the wireless controller pad ay operate as a multi-position detection zone real-time display.

The one or more cameras may be controlled by a camera management system with multiple cameras selected and controlled via the wireless controller pad 60 such as by bringing up a separate interface when the camera button 76 is depressed. Each camera may include recording and playback and day/low night/night capabilities and a PTZ (pan-tilt-zoom) capable camera. The communications may be two-way audio and two-way video via video cameras. The access control vestibule 22 is ADA compliant to make it wheelchair accessible such as with a touch button and/or automatic door openers. A multi-position detection zone may be displayed on the wireless controller pad 60.

A secure facility or premises 28 may include more than one access control vestibule and all are accessible via the wireless controller pad 60 in one example. Dimensions for the two-door one-channel access control vestibule could vary, but example specifications for that example shown in FIG. 2 are about 4 feet wide (a) and 7½ feet in depth (b) and the dimensions may vary depending on application. The power supply could be 110V, 60 Hz or 240V, 50 Hz converted to 24 VDC. The doors as described before may include magnetic high security locks and hardware with 1200 pounds minimum force and individual door controls. The doors are fail safe in an unlocked condition and have high discrimination and the adjustable metal detector allows a varied sensitivity of the metal detector, which can be varied. The installation may include the field assembly of the framing and doors with standard hand tools and no welding is required. It may include a modular electrical package, which is advantageous for assembly, especially for government offices, schools and associated.

The example four-door, two-channel access control vestibule 222 shown in FIGS. 3 and 4 has example dimensions and shows the metal detector 240 is within the access control vestibule on the entrance side and two different options for installation. Example dimensions for this four-door vestibule are about 8 feet wide (c) and 7½ feet depth (d), about 7 feet high, and about 3 feet wide (e) for each compartment. These dimensions may vary depending upon application. Power may be provided by a 110V 60 Hz or 240V 50 Hz power supply and conversion to 240 VDC. The door lock system for both single or double door systems may include magnetic high security locks and hardware with 1200 pounds minimum force, individual door controls, doors that fail safe in an unlocked condition and a high discrimination and adjustable metal detection system. Installation may be a field assembly of framing and doors with standard hand tools. No welding is required and a modular electrical package may be provided.

The manufacturing specifications for both single or double compartment systems may include UL rated bullet resistant ceiling panels and an aluminum frame as high strength 6,005-T5 alloy in an example that is able to withstand 40,000 psi. The bullet resistant glass may have HP white ratings of level-1 for a 0.38 special, level-2 for 9 mm, and level-3 for 0.44 magnum. It may have low spall. This access control vestibule 22 will deter armed robberies and threatened violence to employees and customers when the layout of the vestibule and what an individual sees as they approach the vestibule shows that security is paramount and taken seriously. As explained below, a hovering drone adds to this security and a potential criminal or perpetrator viewing the hovering drone may be inclined to turn away since they know they may already be imaged by a drone camera, which could also track them.

Figure 5A:
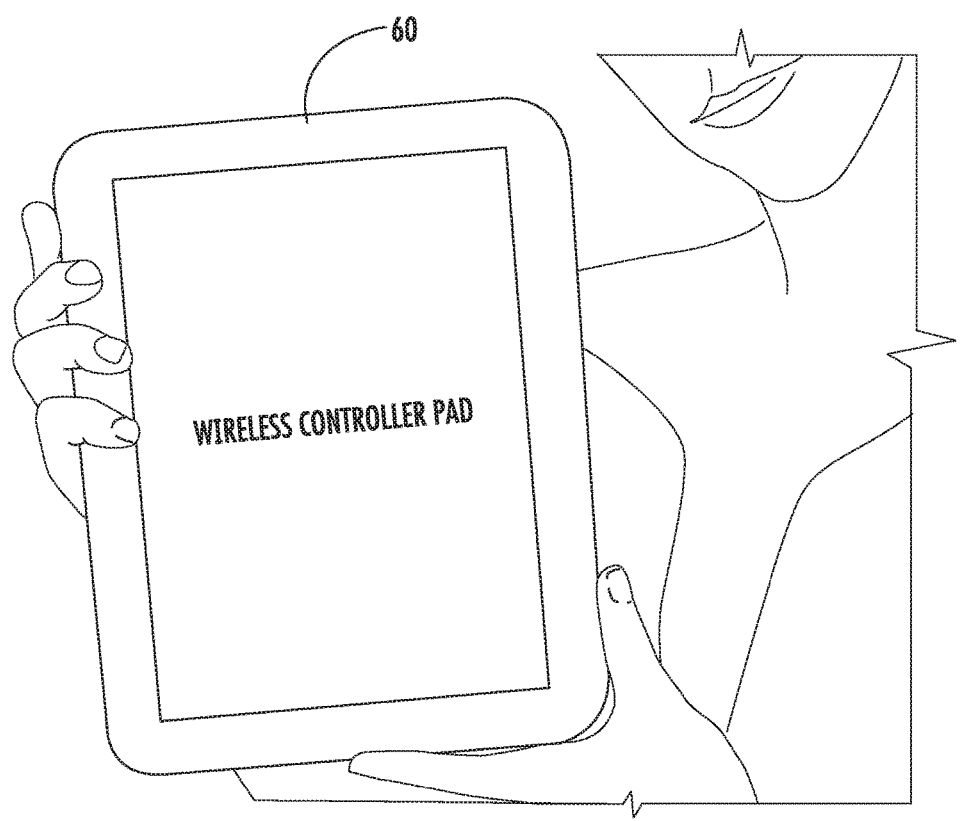
FIG. 5A is an environmental view of an example of the wireless controller pad held by a user in accordance with a non-limiting example.
Figure 5B:
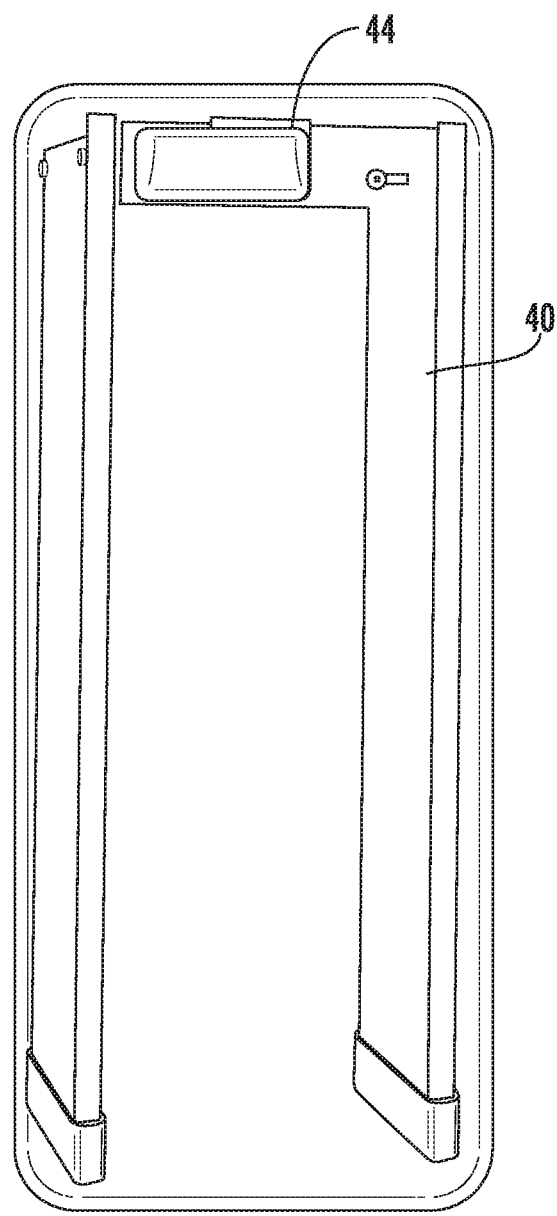
FIG. 5B is a front isometric elevation view of a metal detector that can be used with the access control vestibules shown in FIGS. 1 and 3.
Figure 5C:
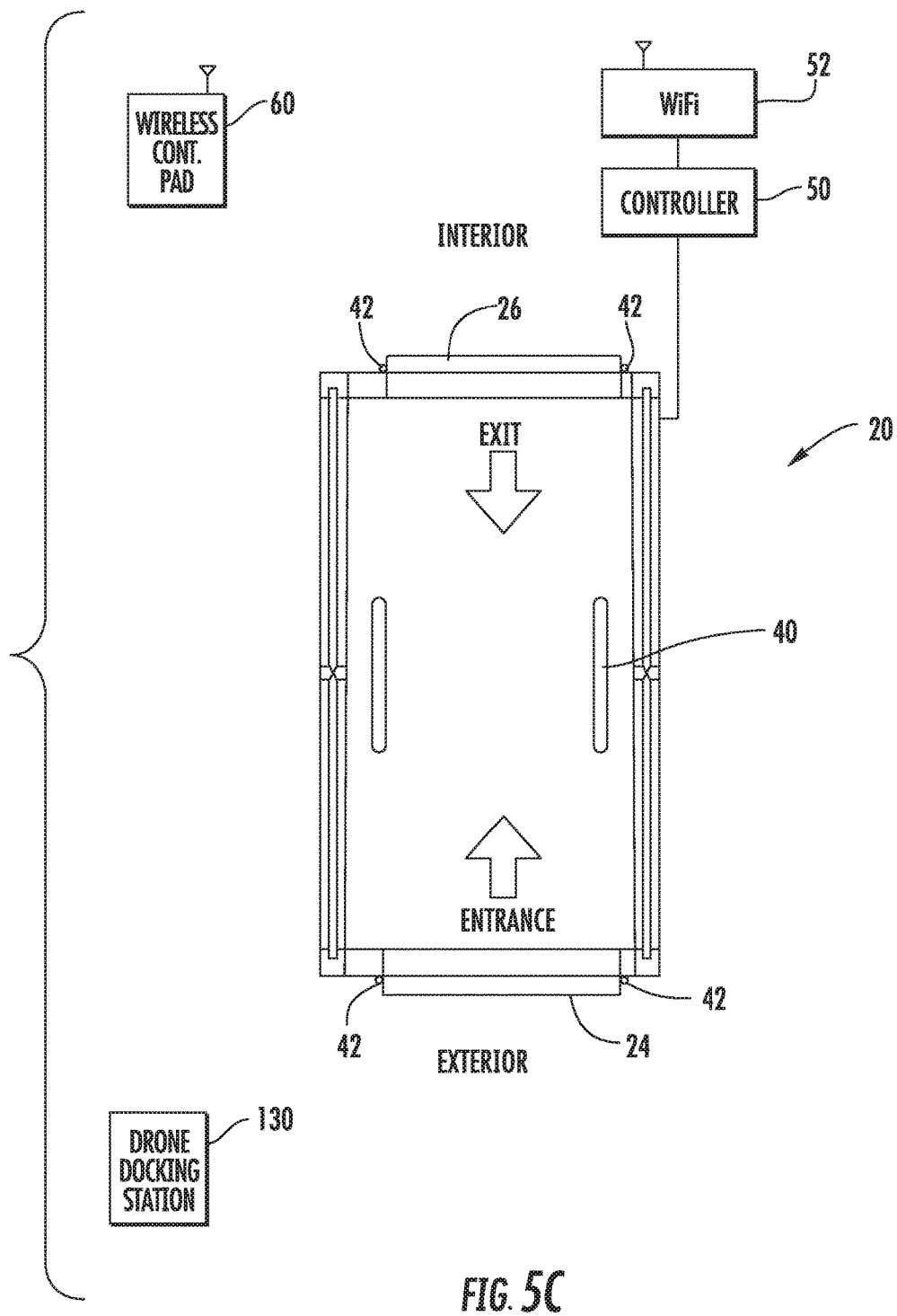
FIG. 5C is a schematic plan view of a wireless access system showing the wireless access vestibule, drone docking station, and other components.
Figure 5D:
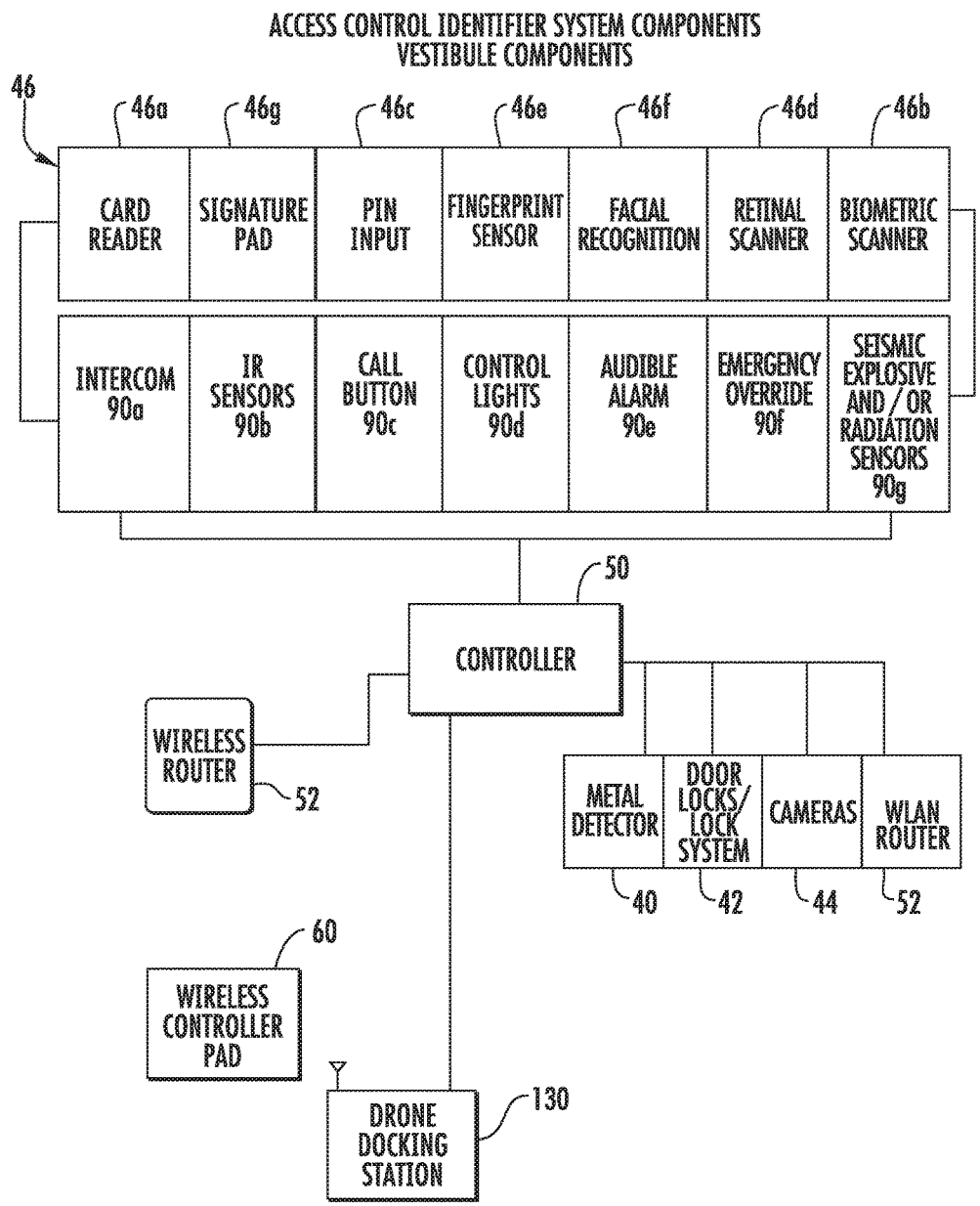
FIG. 5D is a block diagram showing examples of access control identifier systems and access vestibule components.

Other features associated with the access control system are shown in FIGS. 5A and 5B. The relative size of an example wireless controller pad 60 is shown in FIG. 5A and shows the device held by a user. An example walk-through metal detector 40 that can be used in the access control system 20 and positioned within the access control vestibule 22 is shown in FIG. 5B and shows a combination camera 44 and display at the top, which can be associated with audible alarms and visual displays and control lights. Other components may include a control panel for housing the controller, any camera switching circuitry, and a power supply. Other features as noted before include tamper-resistant magnetic locks with a 1,200 pound holding force on all doors and an intercom system with infrared sensors and the ADA call button. An uninterrupted power supply may include four-hour back-up batteries and a low voltage 24 volt DC system.

The system may include traffic control lights and a "teller" trap switch that may be used when the secure premises is a bank and operated by the teller in an emergency or similar situations. Bullet resistant mag lock covers may be included with a high discrimination metal detector. The wireless controller pad 60 provides wireless control in conjunction with a door status monitor, door lock controls, audible alarms and an emergency override, all of which may be controlled via the human machine interface forming part of the display. Other features may include tamper resistant sealed door closures and manually operated doors and a high security continuous hinge formed as high strength hinge material. Different exit control devices may include touch sensor exit devices such as a handicap push button.

ADA (American Disabilities Act) vestibule models may be available and the entry and exit can be split to accommodate building architecture as shown in FIGS. 3 and 4. Biometric identifiers may be available with color matched painted frames and explosion resistant technology may be available and included for the access control vestibule. CCTV (closed captioned TV) systems may be included and compatible with a customer access control card system. Seismic sensor technology may be available with remote monitoring.

The wireless controller pad 60 provides status information for the system, emergency override functionality, reset buttons and an individual door control. The system is highly discriminating in its metal detection and may include high security door hardware with automated interlocking doors and a high security magnetic lock standard. Levels of bullet resistant glass, ceiling structure and frames may be selected.

Figure 6:
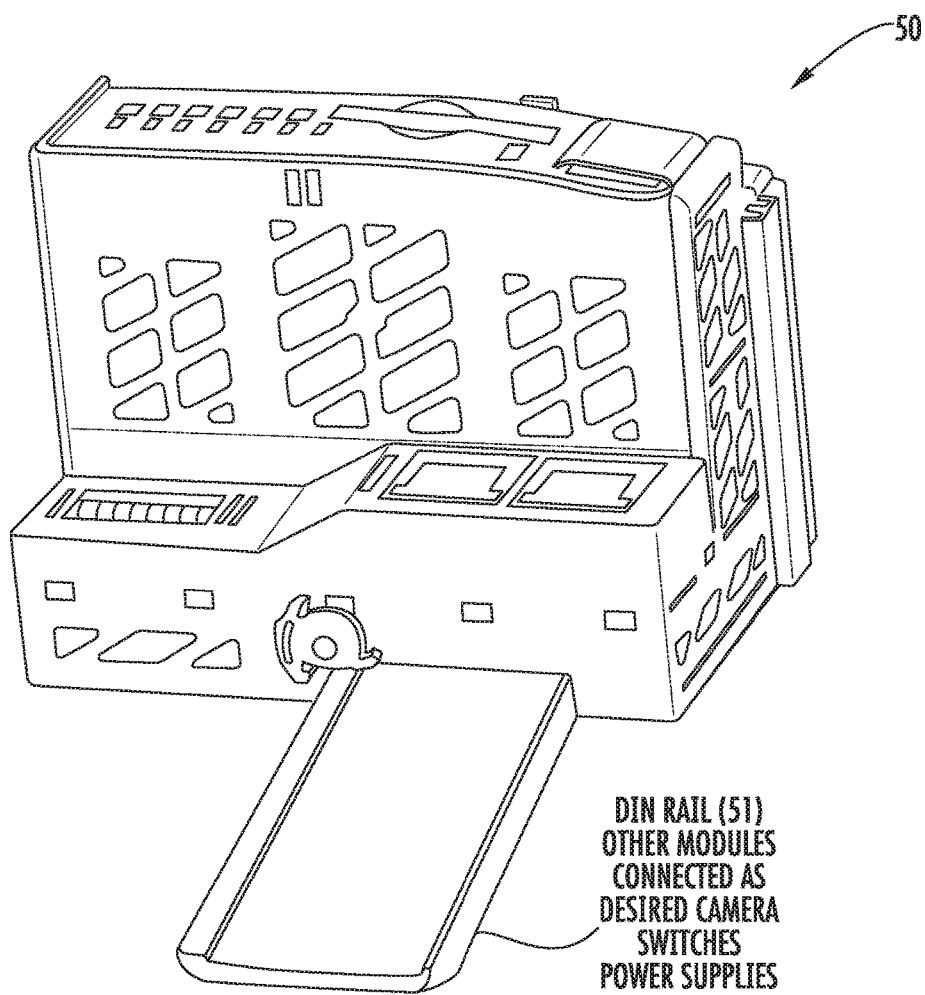
FIG. 6 is a general environmental, isometric view of a programmable logic controller mounted on a DIN rail in accordance with a non-limiting example.

Referring now to FIG. 6, there is illustrated an example controller 50 as an example programmable logic controller that is positioned on a DIN rail 51. Other modules associated with controlling the system 20 may be connected to the DIN rail 51 as desired. The modules may operate with on/off signals and/or analog control. The DIN rail is a standard metal rail used for mounting circuit components and industrial control equipment inside equipment racks. An example programmable logic controller as noted before is a PFC 100 PLC controller manufactured by Wago located in Germantown, Wis., and includes an advanced, 64-bit processor with a built-in server and micro SD card slot. For example, it may include a 12 MB program memory and 64 KB retained memory with two RJ45 configurable Ethernet ports.

In one example, this controller 50 is programmable in accordance with IEC 61131-3 600, and features a 608 MHz ARM Cortex A8 processor that offers high speed processing in support of 64-bit variables. It may support multiple field bus ports including Ethernet and MOD BUS, TCP/UD/RTU, CAN port, PROFIBUS slave, smart grid, and serial RS-232/RS-485. It may be programmable with all IEC 61131 standard languages, including latter diagram, structured text and function block.

A flexible input/output (I/O) configuration may allow it to connect to over 400 of 750 series I/O and specialty modules. It has a small footprint at 62 mm dimension and lo T-ready ensures application security with SSL/TLS 1.2 encryption. It has an extensive 256 MB built-in flash memory with SD card slot for 32 GB of memory or 12 MB depending on the specific device. It may include a smart grid communications support.

The programmable logic controller 50 may work with a switch such as an example SDR-75-74 as manufactured by Mean Well and installed on the DIN rail 51 such as the TS-35/7.5 or 15. The PLC provides a hard real-time system so that results can be produced in response to the inputs.

Figure 7:
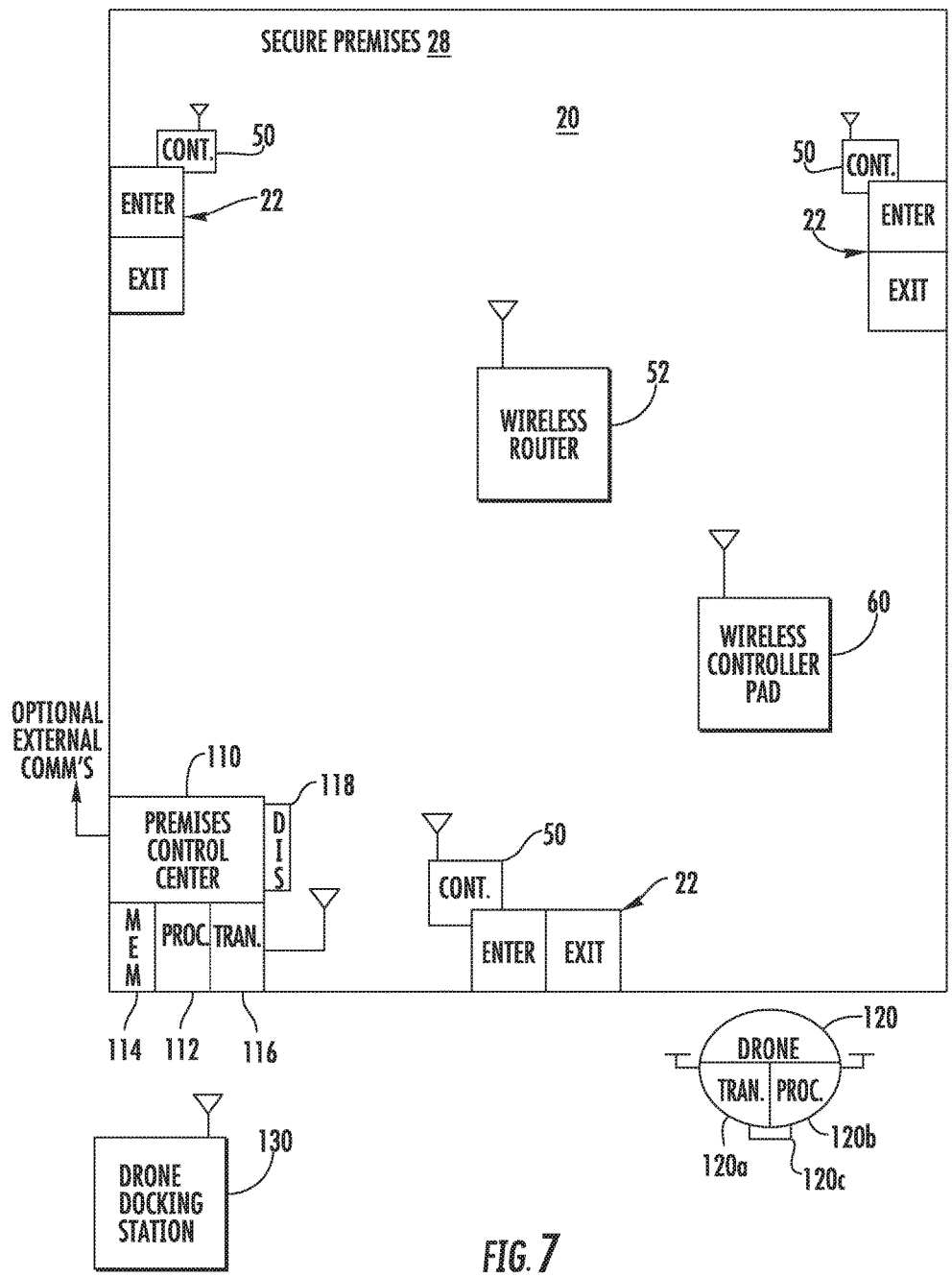
FIG. 7 is a block diagram showing a number of access control vestibules in a secure premises controlled via a single wireless controller pad in accordance with a non-limiting example.

Referring now to FIG. 7, the wireless router 52 may also communicate with a premises control center 110 that could be operative to override an individual operating the wireless controller pad 60. The premises control center 110 would include a processor 112, memory 114, and communications module 116 such as a transceiver that communicates with the controller via a wired or wireless connection. A display 118 would allow a supervisor or other individual at the premises control center to view multiple cameras outside or inside each of the access control vestibules 22 where there are a plurality of such vestibules. As shown in FIGS. 1, 3 and 7, a drone 120 may hover above the premises or multiple drones may be used where a drone is hovering above an entrance and exit corresponding to a selected access control vestibule. The premises control center 110 can control a drone docking station 130, which may include a processor 130*a*, transceiver 130*b*, and memory 130*c* operative with the controller 50 and/or wireless controller pad 60 directly or indirectly. A user such as a security officer operating the wireless controller pad can also select a camera view from the drone by depressing a specific drone button on the display, which could bring up a display to select specific drones if a number of drones are airborne.

Additionally, if an alarm was triggered from the metal detector 40, then the drone could hover and follow that individual such as taking the imagery from the access control vestibule and various general data points such as clothing color, height and other information and the drone camera could then lock onto that individual through appropriate processing at the premises control center as explained in further detail below.

Figure 9:
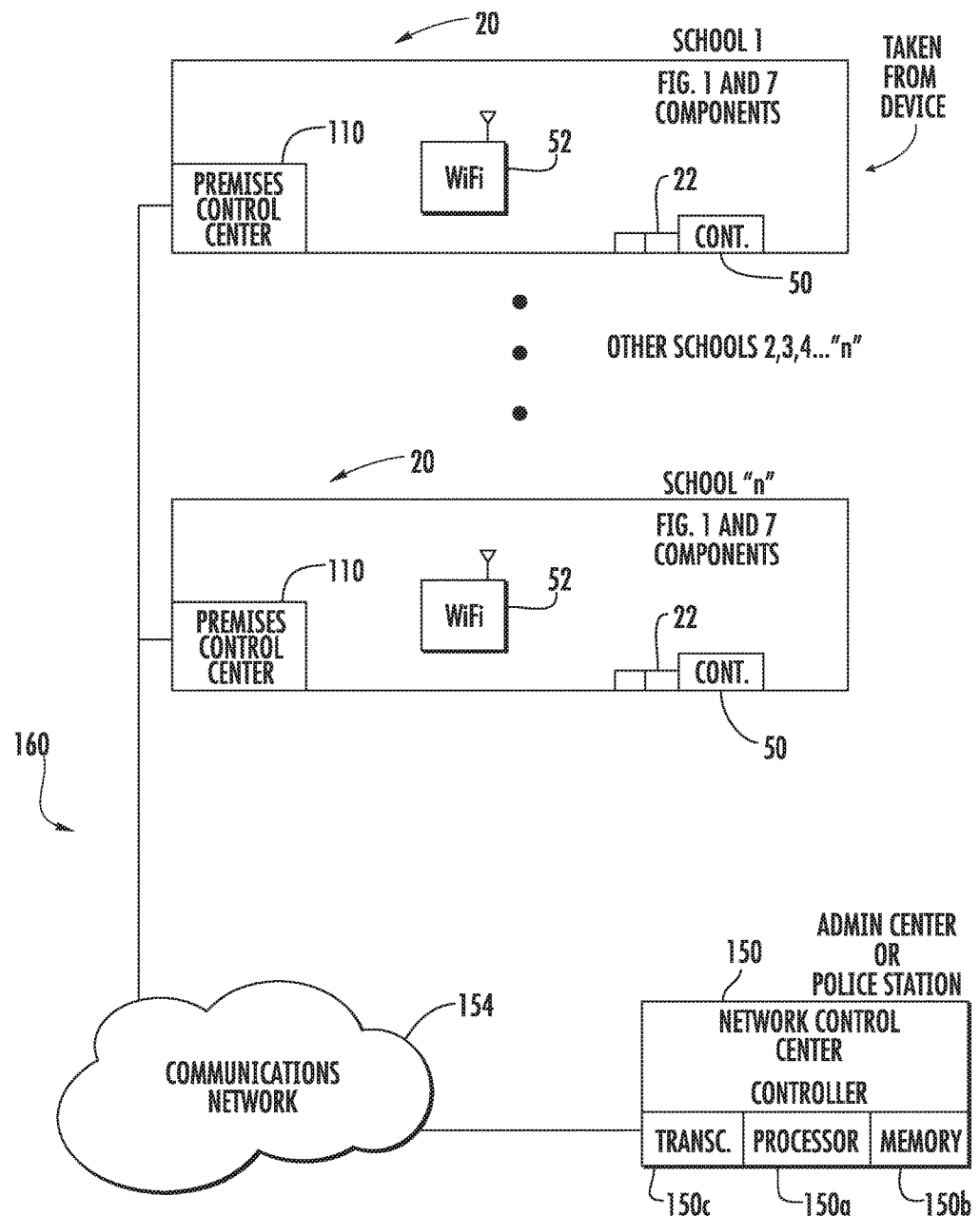
FIG. 9 is a block diagram of an access security network system and different secure premises such as schools, and showing the premises control centers and network control center, such as a police station, in accordance with a non-limiting example.

The drone as an Unmanned Aerial Vehicle (UAV) would include a transceiver 120*a*, drone processor 120*b*, and camera 120*c* (FIG. 7) and could operate also to scan an individual entering or leaving the access control vestibule, especially if an individual is leaving after an alarm has been generated, such as the alarm from the metal detector. The drone processor may perform different levels of verification or transmit imagery that could be processed at a processor such as at the premises control center 110, or as explained below, at a network control center 150 such as operated at a police station (FIG. 9). It is possible the drone 120 may include such level of verification as include different devices and/or sensors to enable, for example, detecting different weapons or the of presence more than one person and collect multiple images and video. The drone 120 may be able to communicate with back intelligence with classification techniques stored at the premises control center 110 such as deep neural net and object matching techniques with biometric techniques, including emotion and personality analysis of a person's cognitive state with analysis of facial expressions and body movement. This could include some cloud-based processing if a connection is made from the secure facility such as through the premises control center 110 to an outside line, including a network control center or other facility. Data may be logged including block chain data. One or more cloud computing modes could be included with a cloud computing environment.

It is possible to use deep learning for input image and recognizing the identity of a subject. The drone docking station 130 may also have processing capability via its processor 130a and the communications module as a transceiver 130b configured to communicate with drones into one or more of the controller and the wireless controller pad 60. A plurality of drones may be docked at the drone docking station for selective airborne operation of a drone and permit constant hovering by at least one drone over the secure premises. The wireless controller pad 60 may be configured to generate and transmit drone control signals to airborne drones or the drone docking station control operation of an airborne drone. There may be devices as part of the controller 50 or premises control center 110 that can include additional processing capability such as digital signal processing (DSP) circuits, programmable processors, application specific integrated circuits (ASICs), field programmable gate arrays (FPGAs), complex programmable logic devices (CPLDs), and other processors.

It may include a cache, read-only memory (ROM), random access memory (RAM), various input/output adapters and sound adapters, network adapter, and user interface adapter with various storage devices for databases. The deep learning based engine may apply face detection to data as input images and the example input images could be normalized to different resolutions, including 256×256. It is possible to add one or more Gaussian distributed instances to any original RGB values or to an HSV domain to multiply by some coefficients and adjust the S and V. It is possible to use different convolutional max-pooling and local response normalization (LRN) layer where input images may be partitioned and data processing could apply an image contrast enhancement to images.

Additionally, the wireless router 52 or premises control center 110 may connect via a wired or wireless connection to a communications network such as the internet or a public switch telephone network (PSTN) in those examples where the access control system does not have to be completely isolated and could connect into a network control center such as a police station that could have override and even the ability to lock and unlock doors. For example, if a security officer or other personnel operating the wireless controller pad 60 in the premises or someone at the premises control center 110 determines that someone entering an access control vestibule is a threat to the public or students if the secure premises is a school, the user could lock all doors and keep the individual within the access control vestibule. The police then would have the only authority to unlock the doors after their appropriate investigation. An emergency signal could be sent from the premises to a network control center such as the police station indicating an emergency has occurred and police must show up immediately to the premises such as a school and determine if the individual within the access control vestibule should be released.

It should be understood that the wireless controller pad 60 can control more than one access control vestibule such as shown in FIG. 7, which shows three access control vestibules 22 controlled by the single wireless controller pad that connects to an individual controller 50 at each access control vestibule via the wireless router. It is possible the wireless router 52 may provide a greater range and signal strength for operating the wireless controller pad in a facility, such as a prison or large financial institution.

It should also be understood that different levels of security could be provided for different individuals entering the secure facility as the premises 28. It is possible that regular individuals would have little security clearance and the metal detector and other sensors, if used, would have full sensitivity for guns, knives, chemicals, and other harmful substances. Different sensors could be adjusted for their sensitivity via the wireless controller pad 60 or premises control center 110 or network control center 150. Some users may have different levels of security on their wireless controller pad by entering specific PIN numbers that would give them different levels of access so that perhaps only doors could be locked and unlocked or a camera function on the drone activated and no other functions activated to make adjustments to the entire system 20 as compared to others with high levels of security who can make greater changes.

Sometimes a user's portable wireless communications device may have firmware or software that would provide a token that would be automatically broadcast or detected when that individual approaches the vestibule 22 and provide a level of access and perhaps make the metal detector less sensitive (FIG. 9). For example, a detective may be carrying a portable wireless communications device that emits a signal such as a token that is received by the wireless router 52 or other sensor and the system may automatically make changes to the system to allow the detective to pass through the metal detector 40 without causing an alarm. Of course, a detective could enter a password or PIN code on a display screen at the entrance to the vestibule or make a call through the intercom or by other means and adjustments made to access the vestibule with a different level of security.

Similar changes could be made for the drone tracking so that only an authorized individual may be able to take control of the drone and actively follow someone and this could be established at the drone docking station or at the controller via an input code to the wireless controller pad and by bringing up a device screen by depressing the device button 87 bring up a drone screen. A code could be entered to gain greater access to drone control besides a hovering mode and reviewing a camera view from the hovering mode. Camera 4, for example, on the screen shot of FIG. 8, could be a drone mode camera to show the imagery from the drone. Other changes could be made.

Similar types of security protocols and access levels can be accomplished at the premises control center besides individuals operating the wireless controller pad and at the network control center 150 as will be explained relative to FIG. 9.

Referring now to FIG. 9, there is shown an access security network system 160 that shows a number of access control systems 20 at different secure premises, each in this case a separate school. A first access control system 20 at a first secure premises 28 is located at a first geographic location and corresponds to as an example school 1. A second access control system 20 is at a second secure premises 22 at a second geographic location remote from the first geographic location such as a second school. Each of the first and second access control systems 20 include the basic components of at least one access control vestibule 22 to facilitate the entrance and exit of individuals into and from the respective secure premises. Although not illustrated in detail, the components as described before relative to the other drawing figures are included and each of the access control vestibules 22 includes a frame and bullet resistant glass and at least one entrance door and exit door. A metal detector is positioned within the access control vestibule through which an individual desiring to enter the secure premises must pass through. The entrance and exit doors include a lock system and at least one camera is configured to image the interior of the access control vestibule and an individual with any access control vestibule. A controller is connected to the metal detector, lock system, and at least one camera for each of these access control systems. A wireless router is connected to the controller and provides a secure, wireless local area network (WLAN) in the vicinity of the access control vestibule.

Each of the access security systems 20 includes at least one wireless controller pad 60 as described before and includes the processor, memory and display on which a user interface is displayed and a wireless transceiver operative with the processor, memory and display and configured to communicate wirelessly over the WLAN with the controller. The processor is operative to permit user interaction via the display and user interface and generate and transmit control signals to the controller to allow the user to control and configure locally the operation of the metal detector, lock system, at least one camera and WLAN.

Each of the secure premises includes a premises control center 110 as explained above that also each includes the processor, memory and premises communications module or transceiver and connected to the controller 50 and operative to communicate with the controller and generate control signals to the controller and override commands from the wireless controller pad and allow a user at the premises control center to control and configure operation of the metal detection system, lock system, at least one camera and WLAN.

A network control center 150 is located at a third geographic location remote from the first and second geographic locations and includes a processor 150a, memory 150b, and network communications module as a transceiver 150c and connected to each premises control center 110 of the first and second access control systems via a communications network 154 and is operative to generate control signals and communicate with any controllers and/or premises control centers 110 at respective first and second access control systems and override commands from the wireless controller pad 60 and premises control center and allow a user at the network control center to control and configure operation of the metal detection system, lock system, at least one camera and WLAN and other components.

There may still be more of a plurality of access control systems 20 at respective other secure premises each located at separate geographic locations remote from each other and remote from the first and second geographic locations. The network control center 150 may be connected to each premises control center at respective access control systems via the communications network 154, which may be formed as one or more of an internet of public switched telephone network, and in an example, the network control center is a police station.

Thus, it is possible for the police also to have a display to visually determine what occurs in each of the secure facilities and override any local operator using the wireless controller pad and/or stationed at the premises control center. They also may make the final decision as to whether someone should be released if they are locked within the access control vestibule or leave them in the vestibule. They may also track through the drone 120 any cars and individuals through long range transmissions that may only be legal by the police or other governmental authorities. This provides better control in some cases. However, the system would not be operative if the access control system is localized and has no outside connection. It depends on the particular designs and requirements of the user.

It should also be understood that the wireless controller pad 60 can control different types of secure entrances and exits that do not have to be designed as physical access control vestibules with frames and metal detection systems as described above. Other entry and exit systems that provide for an access security system can be used and controlled by the wireless controller pad and various components controlled from the wireless controller pad.

It should also be understood that it is possible for the wireless controller to control many other devices such that a button or touch screen button could be included and/or bring up an interface to allow further control of other devices. For example, if it is night and an individual is trying to enter the secure facility, and the metal detector goes off but the individual leaves the vestibule and flees in the night, it is possible that the user of the wireless controller pad could depress a touch screen button for lights and outdoor lights could come on. Other devices could be controlled. For example, there are a number of devices that operate on low voltage, such a 12 volt thermostat, which could be energized by pushing a button on the wireless controller pad. This would switch on a 230 volt air conditioner (AC) compressor. Thus, a low power switch could turn on high power components and devices. The touch screen on the wireless controller pad could be used to turn on a switch and close a contact and allow a much larger, heavier, and more powerful system to operate.

It is also possible that the wireless controller pad could be used to control the release of dogs that may be used to chase a suspect or act for other functions. For example, it is possible that a K-9 officer could be located at the secure facility and when it is determined that a suspect has left the vestibule after setting off an alarm and is fleeing on foot, then a dog could be released from a large dog pound area at the secure facility. Many other advantages can accrue through the use of the wireless controller pad and its functionality.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:
1. An access security system, comprising:
at least one access control vestibule to facilitate entrance and exit of individuals into and from a secure premises, said access control vestibule comprising a frame, and bullet resistant glass and at least one entrance door and exit door;
a metal detector positioned within the access control vestibule through which an individual desiring to enter the secure premises must pass through;
a lock system connected to said entrance and exit doors;
at least one camera configured to image the interior of the access control vestibule and an individual within the access control vestibule;
a controller connected to said metal detector, lock system, and at least one camera and configured to control operation of the metal detector, lock system and at least one camera, said controller including a transceiver;
a wireless router connected to said controller and providing a secure, wireless local access network (WLAN) in the vicinity of the access control vestibule; and a wireless controller pad comprising a processor, memory and a display on which a user interface is displayed and a wireless transceiver operative with the processor, memory and display and configured to communicate wirelessly over the WLAN with the controller, wherein said processor is operative to permit user interaction via the display and user interface and generate and transmit control signals to said controller to allow the user to control and configure locally the operation of the metal detector, lock system, at least one camera, and WLAN as a secure local access security system having no outside connection beyond the secure premises.

2. The access security system according to claim 1, further comprising a drone having a drone processor and a drone transceiver and a camera connected thereto and operative to hover over the secure premises and image the area of the secure premises having the at least one access control vestibule and transmit the images to said wireless communications module of said wireless controller pad.

3. The access security system according to claim 2, further comprising a drone docking station at the premises having a communications module configured to communicate with drones and to one or more of the controller and the wireless controller pad, and a plurality of drones docked at the drone docking station for selective airborne operation of a drone and permit constant hovering by at least one drone over the secure premises.

4. The access security system according to claim 1, wherein said processor at said wireless controller pad is configured to generate and transmit drone control signals to an airborne drone or the drone docking station and control operation of an airborne drone.

5. The access security system according to claim 1, wherein said wireless router provides a secure, wireless local access network of about 50 to about 250 foot range.

6. The access security system according to claim 1, wherein said access control vestibule includes an entrance compartment and an exit compartment, and each compartment having two intercommunicating doors and at least one camera in each of the entrance compartment and exit compartment and configured to image the interior of the compartments and an individual passing therethrough.

7. The access security system according to claim 1, wherein said access control vestibule includes a magnetic lock on each door and an access control identifier system and each connected to said controller, wherein said magnetic locks and access control identifier system are operative to be controlled via the wireless controller pad and from the control signals generated therefrom.

8. The access security system according to claim 1, wherein said access control identifier system comprises one or more of a card reader, signature pad, PIN input, fingerprint sensor, facial recognition, and retinal scanner.

9. The access security system according to claim 1, wherein said access control vestibule further comprises one or more of an intercom, infrared sensors, a call button, control lights, an audible alarm, an emergency override system, and one or more of seismic, explosive and radiation sensors, and each connected to said controller and operative to be controlled by the wireless controller pad.

10. The access security system according to claim 1, further comprising a plurality of access control vestibules, each access control vestibule having a metal detector, a lock system, at least one camera, and a controller connected therewith, wherein said wireless controller pad is connected via said wireless router to each of the controllers to allow user selection, interaction and control of a selected access control vestibule via the wireless controller pad.

11. An access security network system, comprising:
a first access control system at a first secure premises at a first geographic location and a second access control system at a second secure premises at a second geographic location remote from the first geographic location, each of said first and second access control systems comprising;
at least one access control vestibule to facilitate entrance and exit of individuals into and from the respective secure premises, each of said access control vestibules comprising a frame, and bullet resistant glass and at least one entrance door and exit door;
a metal detector positioned within the access control vestibule through which an individual desiring to enter the secure premises must pass through;
a lock system connected to said entrance and exit doors;
at least one camera configured to image the interior of the access control vestibule and an individual within the access control vestibule;
a controller connected to said metal detector, lock system, and at least one camera;
a wireless router connected to said controller and providing a secure, wireless local access network (WLAN) in the vicinity of the access control vestibule;
a wireless controller pad comprising a processor, memory and a display on which a user interface is displayed and a wireless transceiver operative with the processor, memory and display and configured to communicate wirelessly over the WLAN with the controller, wherein said processor is operative to permit user interaction via the display and user interface and generate and transmit control signals to said controller to allow the user to control and configure locally the operation of the metal detector, lock system, at least one camera, and WLAN;
a premises control center at the secure premises and comprising a processor, memory and premises communications module and connected to said controller and operative to communicate with the controller and generate control signals to the controller and override commands from the wireless controller pad and allow a user at the premises control center to control and configure operation of the metal detection system, lock system, at least one camera, and WLAN; and
a network control center located at a third geographic location remote from first and second geographic locations and comprising a processor, memory and network communications module and connected to each premises control center of the first and second access control systems via a communications network and operative to generate control signals and communicate with a controller at respective first and second access control systems and override commands from the wireless controller pad and premises control center and allow a user at the network control center to control and configure operation of the metal detection system, lock system, at least one camera, and WLAN.

12. The access security network system according to claim 11, further comprising a plurality of access control systems at respective other secure premises each located at separate geographic locations remote from each other and remote from the first and second geographic locations, each of the plurality of access control systems including at least one access control vestibule and a premises control center, wherein said network control center is connected to each premises control center at respective access control systems via the communications network.

13. The access security network system according to claim 11, wherein said communications network comprises one or more of an internet and public switched telephone network.

14. The access security network system according to claim 11, further comprising a drone having a drone processor and a drone transceiver and a camera connected thereto and operative to hover over the secure premises and image the area of the secure premises having the at least one access control vestibule and transmit the images to said wireless communications module of said wireless controller pad.

15. The access security network system according to claim 11, further comprising a drone docking station at the premises having a communications module configured to communicate with drones and to one or more of the controller and the wireless controller pad, and a plurality of drones docked at the drone docking station for selective airborne operation of a drone and permit constant hovering by at least one drone over the secure premises.

16. The access security network system according to claim 11, wherein said processor at said wireless controller pad is configured to generate and transmit drone control signals to an airborne drone or the drone docking station and control operation of an airborne drone.

17. The access security network system according to claim 11, wherein each access control vestibule includes an entrance compartment and an exit compartment, and each compartment having two intercommunicating doors and at least one camera in each of the entrance compartment and exit compartment and configured to image the interior of the compartments and an individual passing therethrough.

18. The access security network system according to claim 11, wherein said access control vestibule includes a magnetic lock on each door and an access control identifier system and each connected to said controller, wherein said magnetic locks and access control identifier system are operative to be controlled via the wireless controller pad and from the control signals generated therefrom.

19. The access security network system according to claim 11, wherein said access control identifier system comprises one or more of a card reader, signature pad, PIN input, fingerprint sensor, facial recognition, and retinal scanner.

20. The access security network system according to claim 11, wherein each access control vestibule further comprises one or more of an intercom, infrared sensors, a call button, control lights, an audible alarm, an emergency override system, and one or more of seismic, explosive and radiation sensors, and each connected to said controller and operative to be controlled by the wireless controller pad.

21. The access security system according to claim 11, further comprising a plurality of access control vestibules at each of first and second secure premises, each access control vestibule having a metal detector, a lock system, at least one camera, and a controller connected therewith, wherein said wireless controller pad is connected via said wireless router to each of the controllers to allow user selection, interaction and control of a selected access control vestibule at that premises via the wireless controller pad.

22. The access security network system according to claim 11, wherein said network control center comprises a police station.

* * * * *